United States Patent [19]

Neves

[11] Patent Number: 4,487,092

[45] Date of Patent: Dec. 11, 1984

[54] POWER TONG METHODS AND APPARATUS

[75] Inventor: Billy W. Neves, Odessa, Tex.

[73] Assignee: Eckel Manufacturing Company, Inc., Odessa, Tex.

[21] Appl. No.: 448,710

[22] Filed: Dec. 10, 1982

[51] Int. Cl.³ .................................................. B25B 17/00
[52] U.S. Cl. ....................................... 81/57.18; 81/57.2; 384/610
[58] Field of Search ......................... 81/57.18–57.21; 74/527; 308/230, 233

[56] References Cited

U.S. PATENT DOCUMENTS

| | | | |
|---|---|---|---|
| 1,767,434 | 6/1930 | Childs | 81/57.29 |
| 2,716,352 | 8/1955 | Wilson | 74/527 |
| 2,723,580 | 11/1955 | Brame | 81/57.29 |
| 2,791,914 | 5/1957 | Cornelius | 74/527 |
| 4,084,453 | 4/1978 | Eckel | 81/57.18 |

Primary Examiner—James L. Jones, Jr.

Attorney, Agent, or Firm—Carwell & Helmreich

[57] ABSTRACT

An improved open throat power tong assembly is provided of the type useful for making up and breaking apart threaded pipe joints. The power tong assembly includes a cage plate assembly with a plurality of pipe gripping heads and a partial ring having a plurality of internal cam surfaces. The heads are forced into gripping engagement with the pipe by relative rotational movement between the cam surfaces and the heads mounted in the cage plate assembly. The cage plate assembly may be both supported by and rotationally guided by a plurality of ball bearing assemblies mounted to the cage plate assembly. The bearing balls are biased into engagement with an arc-shaped groove provided in the upper and lower surfaces of the partial ring. During operation of the tong, the ball bearing assemblies ride in the deepest depression track of the groove, but may purposefully ride up the groove sidewall during the final make-up and initial break-out operation.

20 Claims, 6 Drawing Figures

POWER TONG METHODS AND APPARATUS

BACKGROUND OF THE INVENTION

The present invention relates to power tongs of the type commonly used in the petroleum drilling industry for making up and breaking apart threaded connections in casing, tubing, drill pipe, and similar tubular products. In particular, the present invention relates to an open throat power tong with improved means for guiding rotational movement of the cage plate assembly with respect to the tong body.

Power tongs may be generally classified as open throat or closed throat power tongs. Closed throat power tongs generally have a circular ring member which totally encompasses the pipe joint during operation. An advantage of a closed throat or donut-type power tong design is that the tong body and gear will not easily spread, although such tongs have a serious disadvantage in that the tong cannot easily be laterally put on or taken off a string of pipe. Such tongs are shown, for example, in U.S. Pat. Nos. 3,507,174 and 3,635,105. Another version of a closed throat design utilizes a circular gear with a hinged portion, which enables the tong to be laterally put on or taken off the pipe. Such a tong is functionally a closed throat tong, however, because the gear completely encompasses the joint during the make-up or break-out operation. An example of such a closed throat design is shown in U.S. Pat. No. 4,215,602. Because of the difficulty in operation, the latter type of closed throat tong has not been widely accepted in the industry.

Many oil rig operators prefer an open throat power tong, which may be characterized by a partial (not fully circular) ring member. Although such tongs frequently utilize a hinged door to join sides of the tong body, the gear or ring typically has an open throat portion for receiving a pipe section. Thus, the door of an open throat tong may be opened and the throat of the gear aligned with the throat of the body so that the tong assembly can easily be put on or taken off a pipe. Such tongs are shown, for example, in U.S. Pat. Nos. 3,196,717, 4,170,907, and 4,346,629. A major operational advantage of an open throat design tong compared to a closed throat design tong is the ease with which the tong can be laterally moved on or taken off the pipe joint, although such tongs do suffer from various problems associated with "spreading" of the open throat, expecially during high torque operations.

Many types of open throat power tongs utilize a cage plate assembly containing a plurality of gripping heads. The cage plate assembly is typically rotatable both with respect to both the tong body and the rotary gear. Rotational movement of the cage plate assembly is generally guided by a plurality of guide rollers, each having a vertical axis. In one embodiment, the guide rollers are positioned in a groove provided in the top and bottom cage plates. This embodiment is shown, for example, in U.S. Pat. No. 4,084,453. In this case, the shaft for each roller assembly extends through the tong plate, and an annular recess is provided in the open throat rotary gear so that the cage plate assembly may move relative to the rotary gear. In another embodiment, the cage plate guide rollers may be positioned in an annular groove provided in the rotary gear, while the shaft for each roller extends through the upper and lower tong plates into a suitable recess provided in the cage plate assembly.

In either case, such cage plate guide rollers suffer from at least two basic problems: (1) the partial rotary gear is substantially weakened by the annular groove provided for either the guide roller or the vertical shaft and nut for the guide roller, and (2) the cage plate guide rollers experience excessive wear and frequently break because of excessive forces applied to the guide rollers during high torque operations as the partial rotary gear and/or tong plate spread.

A typical prior art solution to the problems associated with cage plate guide rollers in open throat design tongs has been to increase the cross-sectional area of the partial rotary gear, and to increase the size and strength of the cage plate guide rollers and their corresponding shafts. Although these solutions have somewhat alleviated the maintenance problems, they also have added to the costs of manufacturing the power tong and have added undesirable weight to the power tong assembly. Also, as petroleum recovery operations search deeper and deeper, higher torques are required to successfully make-up and break apart tubular joints, so that as spreading of the partial ring and tong plates increases, excessive wear and breakage of the cage plate guide rollers is becoming an increasing problem.

Still another problem in the performance of power tongs is a frictional loss between a rotating cage plate assembly and the upper and lower tong plates. In U.S. Pat. No. 4,084,453, for example, it may be seen that the upper portion of the cage plate assembly may be in physical contact with the upper tong body plate, which adds some frictional loss and detracts from the tong performance as the cage plate assembly rotates. Also, it may be seen in this same patent that the ends of the cage plate guide bearings opposite the retaining nut may be in engagement with the upper or lower surface of the annular groove in the cage plate assembly, which may take some of the cage plate assembly weight off the upper tong plate and thus reduce frictional losses between the cage plate assembly and the tong plates. The problem, however, is that roller-type guide bearings typically are not intended to absorb forces directed along the axis of the roller assembly. Also, when prior art tongs are operating at their highest torque potential, both spreading and bending forces are typically applied to the tong, so that a given guide roller bearing may be experiencing extreme horizontal forces on only one side of the roller and also may be experiencing large vertical forces on only a small portion of the end surface of the bearing. This combination tends to substantially decrease the life of the bearing assembly, or may result in breakage of the roller or roller shaft.

The above described frictional loss may possibly be minimized with a special pad between the cage plate assembly and the tong plate, as shown for example in U.S. Pat. No. 4,215,602. Also, U.S. Pat. No. 4,266,450 discloses the use of both a mounted roller in the annular groove of the cage plate assembly and a horizontally mounted roller riding on the groove base wall. Either of the solutions proposed in the above two patents, however, are believed to be unacceptable to the industry. Additional costs are clearly required for the power tong assembly according to the above two techniques, especially in the latter described patent. Moreover, these last two mentioned patents attempt to deal with the problem of frictional engagement between the cage plate assembly and the tong plate, but do not deal with either of the two basic problems associated with cage plate guide rollers described above, i.e., weakening of the partial ring and roller breakage.

There exists, therefore, a need for a power tong with improved means for guiding the rotation of the cage plate assembly with respect to the tong body, which will be reliable and not experience excessive wear or breakage during operation. Also, there exists a need for an open throat power tong with an improved means for guiding the rotational movement of the cage plate assembly, which does not significantly weaken the partial gear or does not suffer from the other disadvantages of the prior art.

SUMMARY OF THE INVENTION

An improved open throat power tong is provided of the type having a cage plate assembly and a plurality of pipe gripping heads. The cage plate assembly is preferably both supported by and rotationally guided by a plurality of ball bearing assemblies mounted to the cage plate assembly. The ball in each bearing assembly is biased for flexible engagement with an arc-shaped groove provided in the upper and lower surfaces of the partial ring. The arc-shaped groove is relatively small, so that the cross-sectional area and strength of the partial ring are not significantly reduced. The biasing force in each of the ball bearing assemblies may be easily adjusted to alter the rotational guiding forces applied to the cage plate assembly by the ball bearing assemblies.

An improved method of operating an open throat power tong of the type having a cage plate assembly and a plurality of pipe gripping heads is also provided. The rotational movement of the cage plate assembly is normally guided by a plurality of ball bearing assemblies mounted to the cage plate assembly, with the balls residing in the lowest depression track of an arc-shaped groove in the partial ring. During operation of the tong at very high makeup and break out torques, however, the partial ring and cage plate assembly may spread to varying degrees. In that case, the tong may be briefly operated with the balls of each ball bearing assembly compressed towards its respective cage plate and riding in a higher track in the arc-shaped groove of the partial ring.

Accordingly, it is a feature of the present invention to provide an open throat power tong assembly with the reliable guide bearing means for the cage plate assembly, which will not experience excessive wear or breakage.

It is still another feature of the present invention to provide an improved open throat power tong capable of operating at high torques without experiencing excessive power losses associated with the cage plate guide means.

It is still a further feature of the present invention to provide an improved open throat power tong assembly with a plurality of ball bearing assemblies mounted to the cage plate assembly and in engagement with the partial ring of the power tong.

Still another feature of the present invention is to provide an open throat power tong assembly with a plurality of guide bearing balls flexibly mounted between the cage plate assembly and the partial ring.

It is another feature of the present invention to provide an improved open throat power assembly with a plurality of bearing balls mounted to a cage plate and biased into engagement with the partial ring for reducing frictional losses between the cage plate and the tong body as the cage plate assembly rotates.

It is still a further feature of the present invention to provide an improved method of operating an open throat power tong at high torques by allowing controlled radial movement of the individual cage plate guide bearing assemblies with respect to the partial ring of the power tong.

Other and further objects, advantages, and features of the present invention will become apparent from the following detailed description, wherein reference is made to the Figures in the accompanying drawings.

DETAILED DESCRIPTION OF THE PREFERRED EMBODIMENTS

Figure 1:
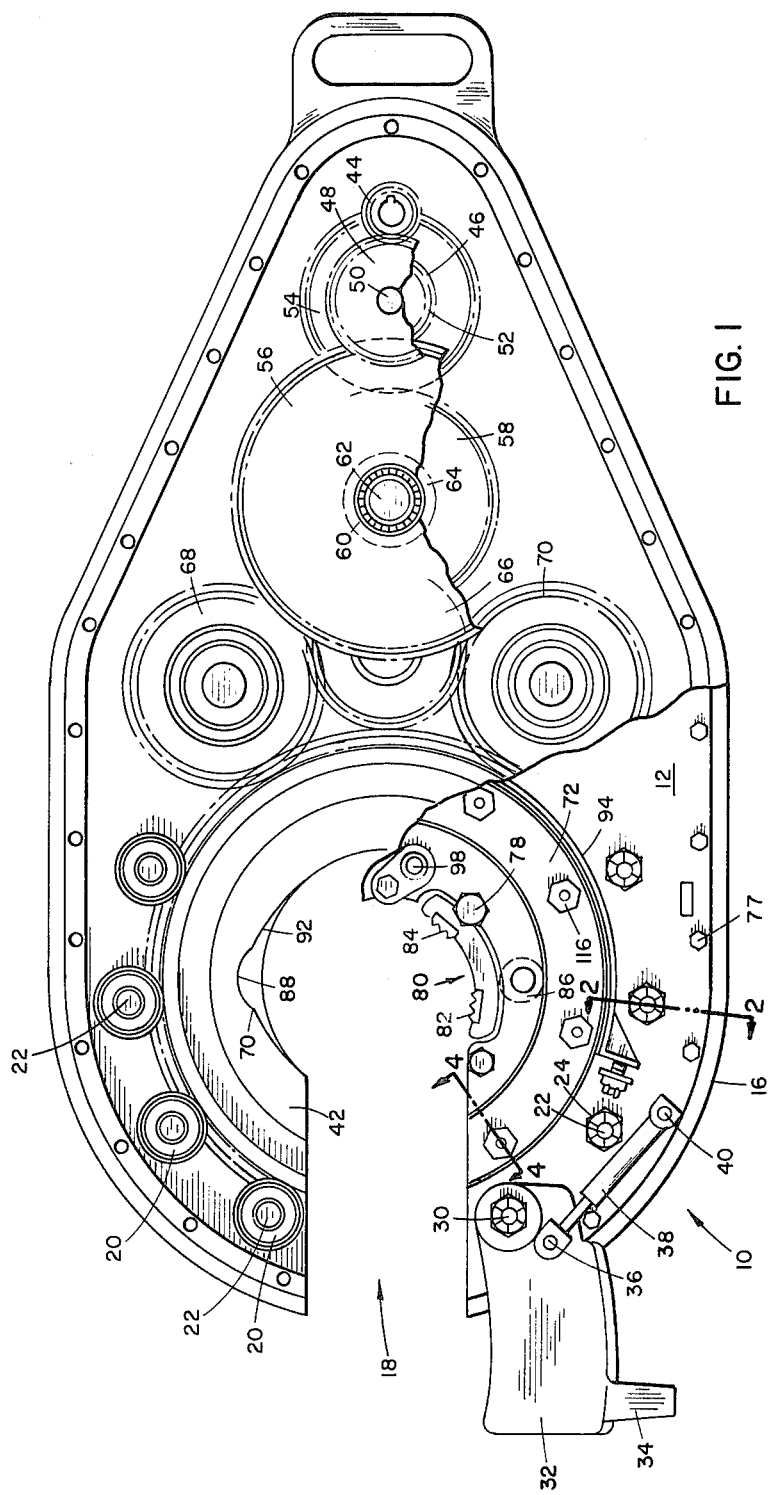
FIG. 1 is a plan view of an entire open throat power tong according to the present invention with a portion of the top plate of a power tong and a portion of the cage plate assembly removed.
Figure 2:
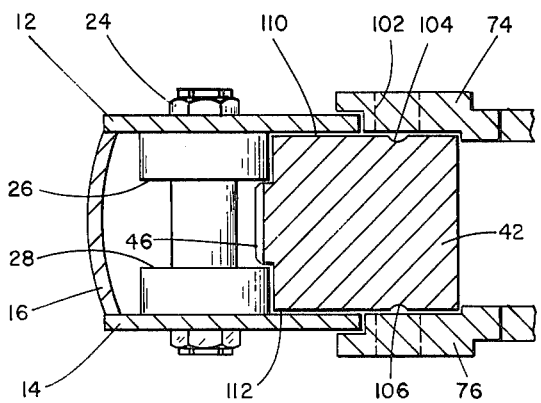
FIG. 2 is a vertical cross-sectional view taken along line 2—2 in FIG. 1.

Referring to the drawings and in particular to FIGS. 1 and 2, there is shown respectively a plan view and a portion of a cross-sectional view of an open throat power tong according to the present invention. In FIG. 1, a portion of the top plate of a power tong body and a portion of the cage plate assembly is removed. In many respects, the open throat power tong of the present invention may be similar to the assembly described in U.S. Pat. No. 4,084,453, and the description and drawings of that patent are hereby incorporated by reference.

The frame 10 of the open throat power tong includes an upper plate 12 and a lower plate 14 spaced apart and bolted to the side walls 16. The frame 10 has an arcuate front portion defining a throat 18 for receiving a section of a tubular member to be threaded. Mounted around the inner periphery of the front portion of the frame 10 are a plurality of rollers 20. The rollers 20 are mounted on the bottom side of the upper plate 12 and the top side of the lower plate 14 and each roller is provided with suitable bearings on a common shaft 22 which is threaded at both ends and which receives retaining nuts 24. The partial ring is guided for rotational movement by engagement with the shoulders 26 and 28 of the rollers 20.

Pivotally mounted to the frame 10 adjacent the throat 18 by means of a hinge pin 30 is a door 32 which may be opened by means of a handle 34 to allow a section of pipe to be placed in the throat 18 of the power tong. Pivotally attached at 36 to the door 32 is one end of a spring-loaded piston assembly 38. The other end of the piston assembly 38 is pivotally attached at 40 to the frame in order to retain the door in the open or closed position. The door and piston assembly are shown in the open position in FIG. 1, although it would be understood that the door assembly may be closed, and that a door latch mechanism (not shown) may be provided for cooperation with a corresponding hook (not shown) mounted to the frame 10 so that the door 32 can be securely locked in place after the pipe section has been placed into the throat 18.

The pipe gripping mechanism includes a partial ring 42 which comprises a rotary gear mounted for rotation within the frame 10 and having an opening adapted to be aligned with the throat 18 of the frame. The ring 42 is guided on its outer periphery and retained within the frame 10 by the rollers 20. Rigidly secured to the outer periphery of the projection of the ring 42 are gear teeth 46.

The ring 42 may be rotated relative to the frame 10 by means of the drive train shown in FIG. 1. The drive train includes a motor drive gear 44 which engages a clutch assembly 46. The motor drive gear 44 may mesh with the clutch drive gear 48 which is rigidly attached to the clutch shaft 50. The clutch assembly also includes a low speed clutch gear 52 and a high speed clutch gear 54, which can be selectively actuated by moving a shifting collar (not shown) which surrounds a clutch shaft 50 by means of a conventional shifting assembly (not shown). The low and high speed clutch gears 52 and 54 mesh with low and high speed pinion gears 56 and 58, respectively. The low and high speed pinion gears 56 and 58 are carried by a sleeve 60 rotatably mounted on a bearing post 62. The sleeve 60 includes gear 64 which meshes with pinion idler gear 66. The pinion idler gear 66 in turn drives rotary idler gears 68 and 70 which mesh with the gear teeth 46 on the ring 42. The drive train is powered by a motor which has not been illustrated in the drawings. However, it will be understood that any conventional motor may be employed which is capable of rotating the motor drive gear 62 in either direction, including particularly a dual speed hydraulic motor. It will be further understood that the spacing of the gears 68 and 70 is such that at least one of the gears 68 and 70 is always in driving engagement with the gear teeth 46 of the partial ring 42, even when the opening of the partial ring 42 is toward the rear end of the power tong assembly.

The pipe-gripping mechanism further includes a die carrier or cage plate assembly 72 which is mounted for rotation on the tong and has an opening which is adapted to be aligned with the throat 18 of the frame and the opening of the partial ring. The cage plate assembly 72 includes upper and lower arcuate plates 74 and 76, respectively, spaced apart by conventional spacer sleeves (not shown). The upper and lower body plates 12 and 14 can be held in position by bolts 77 shown in FIG. 1.

Pivotally mounted to the cage plate assembly 72 by hinge pins 78 are a pair of link members 80, one of which is shown in FIG. 1. Each of the link members 80 normally carries a front die 82 and a rear die 84, respectively. Each of the link members 80 also includes a head roller 86, which is rotatably mounted by a head roller pin between the arcuate upper and lower wall portions and acts as a cam follower. Although front and rear dies have been illustrated, it will be appreciated that each of the link members 80 preferably carry two or more dies mounted for engagement with a tubular member. Also, it should be clearly understood that although a hinged die carrier 80 is depicted in FIG. 1, the present invention is equally adaptable to an open throat power tong having sliding heads, as shown for example in U.S. Pat. No. 4,089,240 and U.S. Pat. No. 4,334,444. With respect to the design and operation of an open throat power tong according to the present invention with sliding heads, the description and operation of such sliding heads as described in the latter patent are hereby incorporated by reference.

The inner surfaces of the partial ring 42 are provided with arcuate depressions adapted for engagement with the head rollers 86. Although only one of the depressions is shown in FIG. 1, it should be clearly understood that a neutral cam surface and a pair of cam surfaces are provided for each of the link members 80. Depression 88 serves as a neutral cam surface for receiving the head roller 86 when the pipe gripping mechanism as in its initial rest position. The depressions 92 serve as cam surfaces for urging the dies in gripping engagement with the pipe section when the ring 42 is rotated with respect to the cage plate assembly 72.

Mounted to the upper plate 12 of frame 10 is an arcuate brake band 94 and retainers, which are more particularly describe in U.S. Pat. No. 4,084,453. Also the open throat power tong of the present invention preferably includes a pivotally mounted backing pin 98, which is also more fully described in the last cited patent.

As shown in FIG. 2, the upper and lower cage plates 74 and 76 overlap the upper and lower tong body plates 12 and 14, respectively. The ball bearing assemblies cannot be seen in the vertical cross-section taken along lines 2—2 in FIG. 1. The location, however, of the aperture in the cage plates for such a ball bearing assembly is shown by the dashed lines 102. When the cage plate assembly is rotated so that a ball bearing assembly is aligned with the cross-sectional line 2—2, the aperture for the bearing assemblies with respect to the other components is therefore indicated in FIG. 2. Also, it will be seen that the partial ring 42 does not include a conventional rectangular-shaped groove, but rather includes relatively small arc-shaped grooves 104 and 106 cut into the upper and lower surfaces of the partial ring 42, respectively.

Figure 3:
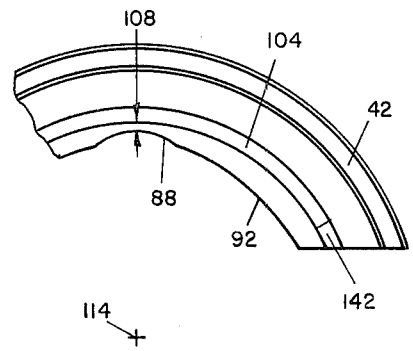
FIG. 3 is a plan view of a portion of a partial ring according to the present invention.

Referring now to FIG. 2 and the top view of a portion of the partial ring shown in FIG. 3, the arc-shaped groove will be discussed in further detail. It should be understood that the arc-shaped groove is preferably formed in both the top surface 110 and the bottom surface 112 of the partial ring 42, although one such groove could theoretically be eliminated. For instance, it is possible that the cage plate assembly 72 may be sufficiently guided under certain circumstances by engagement with a plurality of ball bearing assemblies in contact only with the top groove 104, and that no guiding engagement need be provided for the bottom plate 76 of the cage plate assembly 72. Generally, however, both grooves will be desired to sufficiently guide the cage plate assembly, especially during high torque operations.

Each of the arc-shaped grooves 104 and 106 is cut in an arcuate path spaced a selected distance from the center axis of the power tong, which also corresponds to the central axis 114 of the partial ring. Although the cross-sectional shape of the groove 104 and 106 may be in any number of arcuate designs, it has been found that an arc-shaped cross-sectional design is fully satisfactory and is preferred for ease of manufacturing. Preferably, the radius of the arc-shaped groove is slightly larger than the radius of the ball, and preferably between 1/16 of an inch and ¼ of an inch larger in radius than the radius of the ball. The arc-shaped groove may also be cut into any desired depth, but has been found that a depth of ⅛ of an inch, and preferably between 1/16 and ¼ inch, is sufficient to accomplish the purposes of the present invention. As previously noted, it is important to provide an open throat power tong with a partial ring of sufficient cross-sectional size and shape that the gear will experience a minimum amount of spreading during high torque operations. The weakest part of the partial ring is generally the cross-sectional area adjacent the neutral cam surface 88, since the gear is thinner at that location. By way of example, if an arc-shaped groove is cut from the upper and lower surfaces of an open throat gear to a depth of approximately ⅛ of an inch, it can be readily understood that such a gear is much stronger than a gear having conventional rectangular-shaped grooves approximating 1½ inch wide and cut to a depth of approximately 1½ inches.

As previously noted, spreading of a partial ring relative to the cage plate assembly in prior art tongs frequently resulted in extreme horizontal forces being applied to prior art cage plate bearings, which often resulted in extreme wear or breakage of the cage plate bearings. Accordingly to the present invention, the grooves 104 and 106 do not substantially weaken the partial ring, so that the partial ring of the present invention is less likely to spread compared to prior art partial rings. Also, as a prior art partial ring spreads and high forces are transmitted to the cage plate bearings, extreme frictional forces and binding forces result between the cage plate assembly and the partial ring. Since the present design of an open throat tong results in a partial ring which will experience less spreading under high torque operations, the power tong according to the present invention is able to generate higher torques with the same power input.

Figure 4:
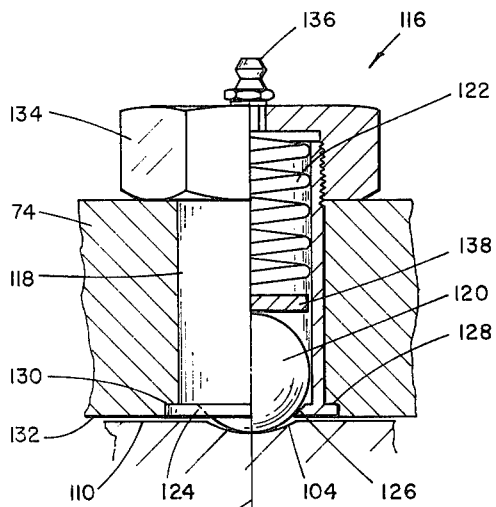
FIG. 4 is a vertical view, partially in cross-section, of a portion of the power tong taken along line 4—4 in FIG. 1.

Referring now to FIGS. 1, 2 and 4, the power tong assembly having cage plate ball bearings according to the present invention will be further discussed. As shown in FIG. 1, the ball bearing assemblies 116 may be equally spaced apart on the cage plate assembly, and are preferably fitted in both the upper and lower cage plates. Thus, approximately 12 to 20 ball bearing assemblies may be used in a given open throat power tong. The location of the ball bearing assemblies relative to the tong plates and the partial ring may be seen in FIG. 2, since the lines 102 represent the diameter of the aperture in the upper and lower cage plates for a ball bearing assembly if the axis of the ball bearing assembly were in line with the cross-sectional line 2—2. Although FIG. 4 depicts an enlargement of only an upper ball bearing assembly 116 and a portion of both the upper cage plate 74 and a portion of the ring 42, it will be understood that similar ball bearing assemblies may be secured to the lower cage plate for engagement with the arc-shaped groove 106.

A typical ball bearing assembly 116 may comprise an outer cylindrical shaped housing 118, and metal ball 120 movable within the housing, and a helical spring 122 biasing the ball towards the arc-shaped groove 104. A circular retainer lip 124 is secured to the housing 118 for retaining the ball within the housing, and surface 126 of the retainer lip is preferably tapered along an arcuate path approximating the radius of the ball. The outer diameter of the housing 118 is slightly larger than the circular aperture in the cage plate for the ball bearing assembly, and a circular shoulder portion 128 secured to the housing limits movement of the housing relative to the cage plate. If desired, a recess 130 may be provided in the cage plate 74, so that the shoulder 128 does not extend beyond the lower surface 132 of the cage plate. The upper portion of the housing 118 is threaded for engagement with a nut 134, which may be torqued against the upper cage plate 74 to secure the assembly in place. An aperture may be provided in nut 134 for receiving a standard grease fitting 136, so that lubricant may be supplied to the surface 126. Also, a flat washer 138 may be provided for insuring that the end of the spring 122 does not marr the ball 120.

The center line or axis 140 of the cylindrical housing passes through the center of the ball 120 and the lowest depression in the groove 104 as the cage plate assembly is being rotated under low torque conditions. The compressional force of the spring 122 causes the ball to normally ride in the lowest part of the groove 104, and thus the cage plate assembly 72 is guided as it rotates relative to the gear 42. Also, it may be understood that the weight of the cage plate assembly 72 may be vertically supported by the ball bearing assemblies 116 in the upper cage plate 74 so that no additional bearings or special wear pads are required. Thus, the ball bearing assemblies 116 may normally support the top and bottom cage plates 74 and 76 against sliding frictional engagement with the partial ring 42 and the top and bottom tong plates 12 and 14. Each of the ball bearing assemblies, and in particular the ball and the biasing means, may provide support means for at least partially supporting the weight of the cage plate assembly, which, in turn, reduces or eliminates the frictional force between the cage plate assembly and the tong plates as the cage plate assembly rotates.

It may be understood that one or more of the ball bearing assemblies 116 may rotate into the upper throat portion of the partial ring. The ball 120 will be secured within the housing 118 by the retainer 124. Referring to FIG. 3, the groove 104 may be cut slightly deeper at the location 142 adjacent the throat of the gear, so that neither the end of the groove 104 nor the ball 120 will chip as the ball moves from the open throat portion of the partial ring into engagement with the groove 104.

Figure 5:
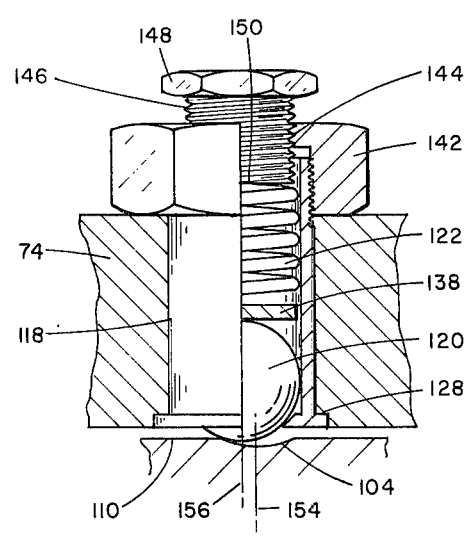
FIG. 5 is a vertical view, partially in cross-section, of another embodiment of the apparatus depicted in FIG. 4 and typical of a high torque situation.

FIG. 5 depicts an alternate embodiment of a ball bearing assembly according to the present invention, with items similar to those depicted in FIG. 4 assigned the same designation numbers. The nut 142 contains a large circular aperture 144 threaded for engagement with the external threads of the bolt 146 having a standard hexagonal-shaped head 148. The end surface 150 of the bolt is in engagement with the spring 122, and may be axially moved relative to the housing 118. The force or biasing means on the a ball 120 may thus be easily adjusted to a preselected amount by turning the bolt 146. For instance, the operational instructions for the power tong might indicate that each of the ball bearing assemblies in the upper cage plate could be moved into the open throat position and the bolt 148 "backed-off" until there was no pressure being exerted on the ball 120 by the spring 122. Thereafter, each of the ball bearing asemblies may be properly adjusted so that the spring exerts a preselected force on the ball by turning the bolt 146 three full turns inward (toward the ball). Similarly, the bottom ball bearing assemblies may also be adjusted to a preselected force. Since the bottom ball bearing assemblies need not vertically support the weight of the cage plate assembly, the bottom ball bearing adjustment bolts may each be typically rotated inward toward the bottom balls to exert a lesser force on the bottom balls, e.g., the bottom bolts may be rotated two turns.

FIG. 5 also illustates a possible position for the ball bearing assembly relative to the partial ring during final make-up or initial breakout operations. During such operations, the tong is likely at its maximum torque potential, which is the time the prior art cage plate assembly rollers frequently experienced failure. Even though the partial ring 42 of the present invention is stronger than prior art partial rings because large grooves are not cut into the partial ring, it is recognized that some spreading of the partial ring relative to the cage plate assembly is likely. Rather than utilize larger cage plate rollers, Applicant purposefully allows the ball bearing assemblies to move radially relative to the lowest depression in an arc-shaped groove. (As used above, the term radially means radially with respect to an imaginery pipe secured by the power tong, which movement is also radial with respect to the partial ring.) For instance, if the partial ring depicted in FIG. 5 were to spread, the center line 156 of the bearing assembly may be spaced ¼ inch or more from the lowest depression 154 in the arc-shaped groove. In other words, as a partial ring spreads, the ball 120 purposefully and controllably rides up the arc of the groove 104. Such rising movement of the ball is resisted by the spring 122, and thus the bolt 148 provides a suitable means for controlling the amount that the ball moves from the lowest depression in arc-shaped groove in response to the ultimate tong spreading condition for the tong.

It is possible that the ball 120 may move completely out of the groove during an extremely high torque operation, although preferably the ball will always remain within the groove. When such an extremely high torque is eliminated, the ball bearing assembly will tend to return to a position in alignment with the lowest depression 154 in the groove 104, and such movement will be assisted by the force of the spring 122 and the resilience of the metal components which were "spread" under the high torque situation.

Although the present invention is suitable for use in any open throat tong regardless of the cam angle of the tong, the tongs of the present invention are particularly suitable for high torque operations. Before operating tongs according to the present invention, the cage plate ball bearing assemblies may be adjusted so that a force within a preselected range is applied to each of the balls, in the manner described above. It may not be necessary, of course, to readjust the ball bearing assemblies each time the power tong is used on a particular job site. The basic operation of the power tong according to the present invention is described in U.S. Pat. No. 4,084,453, which has been incorporated herein by reference.

A further advantage of a power tong described above is that there is a very nominal amount of frictional force required to obtain rotary movement between the ball bearing assemblies and the partial ring during normal operation of the power tongs. In other words, the cage plate assembly will initially remain stationary while the partial ring rotates relative to the cage plate assembly until the gripping dies are locked into a biting position. Thereafter, the cage plate assembly and the partial ring rotate in unison while the pipe is being made up or broken apart, and during this stage of operation there is no substantial rotational movement between the balls 120 and the partial ring 142. This design is thus functionally different than the design of a cage plate guide rollers shown in either U.S. Pat. No. 4,084,453 or U.S. Pat. No. 4,266,450, since in the latter two patents there is continued movement between the guide rollers and the cage plate assembly as the pipe is being made up. Thus, the design of the present invention reduces wear on the balls 120 because the balls need not move to any substantial degree with respect to their engaging surface on the partial ring during the operation of making up or breaking apart a pipe joint.

Figure 6:
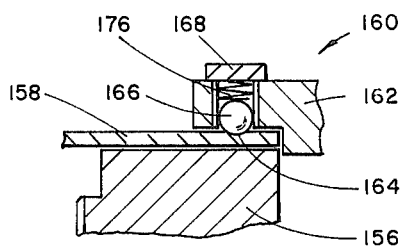
FIG. 6 is a vertical cross-sectional view of an alternate embodiment of the portion of the apparatus shown in FIG. 2.

Although not preferred, it is possible that a modified ball bearing assembly may be employed so that the ball rides in an arc-shaped groove in the top and bottom tong plates, rather than riding in a groove in the partial ring. Such a design is generally shown in FIG. 6 to include a partial ring 156 having no grooves. In such a design, the top tong plate 158 and a bottom tong plate may each be extended inwardly toward the central axis of the power tong assembly, which increases the strength of the tong plates to resist spreading forces. A modified typical ball bearing assembly 160 having a ball 166, a spring 170 and a nut 168 is shown. The modified ball bearing assembly 160 is housed in a revised cage plate assembly having a top cage plate 162. The ball 166 may ride in the groove 164 formed in the top plate 158, and a similar groove and ball bearing assembly may be provided for the bottom plate.

A power tong with the ball bearing assembly shown in FIG. 6 may have many of the advantages and features previously described and, in particular, advantages and features of the ball bearing assembly shown in FIGS. 5 and 6. A disadvantage of such a design, however, is that the ball 166 would constantly rotate with respect to the groove 164 as the pipe is being made up and broken apart. It is also possible that a power tong may be provided with one set of ball bearings (either the top ball bearings or the bottom ball bearings) riding on either the top or the bottom tong plates, respectively, while the other set of ball bearing assemblies rides in a groove provided in the partial ring.

It will be understood that in the preferred embodiment, grooves 104 are cut in the upper and lower surfaces of the partial ring 42. Referring now to FIGS. 2 and 3, it is a feature of the invention that the grooves 104 be cut to pass very close to the deepest depression in the neutral cam surface 88. Thus in FIG. 3, it will be seen that the groove 104 is adjacent the neutral cam surface, and is separated by the spacing 108, which is preferably less than 1 inch, and preferably between ⅛ and ½ inches. By cutting the grooves 104 adjacent the neutral cam surfaces, the strength of the tong to resist spreading is increased because the tong plates extend as far as practical inward toward the axis of the tong body. Moreover, this spacing of the grooves with respect to the neutral cam surface minimizes the diameter, and therefore the weight, of the cage plate assembly.

All the components described herein may be preferably fabricated out of metal. Various types and forms of biasing means other than a helical spring may be used to bias the ball into engagement with the arc-shaped groove, such as rubber spacers or bladders filled with compressible fluids. Although it is preferably to provide a spherical object for engagement with the arc-shaped groove, it should be understood that other designs are within the scope of the present invention. For instance, a cylindrical-shaped shaft may be provided within a housing for the bearing assembly, with the bottom portion of the shaft in contact with the arc-shaped groove rounded to form a surface similar to a portion of the surface of a ball.

Similarly, it is preferred that the ball bearing assemblies of the present invention ride in an arc-shaped groove, meaning a groove cut in the shape of an arc of a circle. It is possible, however, that the ball may ride on a flat surface and that no groove would be required, that a groove may be formed in any arcuate path, or that a groove may be formed in some shape other than the shape of an arc. An arc-shaped groove is preferable, however, because of ease in manufacturing, and the fact that such a groove allows the ball to ride up the groove sidewall during extremely high torque operations.

It should be understood that according to the present invention, references to the shape of the groove refers to its shape as shown in cross-section of the partial ring, as shown, for example, in FIG. 2 to be arc-shaped. As described herein and more fully shown in the cited prior art patents, the path of the groove is also arcuate, i.e., the path of the groove follows the general partial-ring configuration of the partial ring or gear. Because of its guiding function, both prior art grooves and the grooves according to the present invention are also cut in the configuration of a circle having its center along a line passing through the axis of the tong body.

It should also be understood that a tong according to the present invention will normally be operated in a substantially horizontal position. Reference to the top and bottom plates or to other components, as well as the use of the terms upper and lower (when referring for instance to surfaces on the partial ring) should be understood in this description context, and clearly are not intended in any sense as limitations.

It is therefore apparent that the present invention is one well adapted to obtain all the objects and advantages hereinabove set forth, together with other advantages which will, be obvious and inherent from the description of the methods and apparatus itself. It will be understood that certain combinations and subcombinations are of utility and may be obtained without reference to other features and subcombinations and are contemplated by and within the scope of the present invention.

What is claimed is:

1. An open throat power tong assembly for rotating a tubular member to make up or break apart a threaded joint, comprising:

a tong body having a first throat portion for receiving said tubular member;

a cage plate assembly rotatably mounted to said tong body and having a second throat portion for receiving said tubular member;

a plurality of gripping members carried by said cage plate assembly and movable for gripping engagement with said tubular member;

a partial ring member rotatably mounted within said tong body and having a third throat portion for receiving said tubular member and a plurality of cam surfaces for increasing the force exerted by said gripping members on said tubular member;

an arcuate groove formed on a surface of either said tong body or said partial ring member and having a variable diameter responsive to radial spreading of said power tong assembly;

power means for rotating said partial ring member relative to said tong body;

a plurality of bearing assemblies each mounted to said cage plate assembly; and each of said bearing assemblies including (a) guide means axially movable with respect to said cage plate assembly and in engagement with said arcuate groove for rotatably guiding said cage plate assembly with respect to said tong body; and (b) biasing means for resisting axial movement of said guide means away from said arcuate groove during radial spreading of said power tong assembly.

2. The open throat power tong as defined in claim 1, wherein said arcuate groove has an arc-shaped cross-sectional configuration.

3. The power tong as defined in claim 2, wherein each of said bearing assemblies further comprises:

a cylindrical-shaped housing for substantially containing said guide means; and stop means for retaining said guide means within said housing.

4. The power tong as defined in claim 3, wherein said guide means comprises a ball member, and said biasing means comprises a helical spring within said housing.

5. The power tong as defined in claim 2, wherein each of said bearing assemblies further comprises:

adjusting means for varying the force exerted on said guide means by said biasing means.

6. The power tong as defined in claim 4, wherein each said guide means further comprises adjusting means for compressing said helical spring for increasing the force exerted on said ball member.

7. The power tong as defined in claim 3, wherein each of said bearing assemblies further comprises:

a shoulder portion secured to said housing for engagement with said cage plate assembly; and a nut member for threaded engagement with said housing and for securing each of said bearing assemblies relative to said cage plate assembly.

8. The power tong as defined in claim 1, further comprising:

said cage plate assembly including upper and lower cage plates; and said plurality of bearing assemblies are mounted to both said upper and lower cage plates for engagement with upper and lower surfaces of said partial ring.

9. The open throat power tong as defined in claim 1, wherein said biasing means at least partially reduces frictional engagement between said cage plate assembly and said tong body.

10. The open throat power tong as defined in claim 1, further comprising:

said arcuate groove including a deep depression track for engagement with said guide means when said power tong is operated at a relatively low torque condition and at least one shallow depression track for engagement with said guide means when said power tong is operated at a relatively high torque condition; and each of said bearing assemblies is aligned for engagement with said arcuate groove.

11. The open throat power tong as defined in claim 1, further comprising:

said tong body having an arc-shaped groove formed on the surface of said tong body; and each of said plurality of bearing assemblies is aligned for engagement with said arc-shaped groove.

12. The open throat power tong as defined in claim 1, further comprising:

said partial ring member having an upper arc-shaped groove formed on an upper surface of said partial ring member and a lower arc-shaped groove formed on a lower surface of said partial ring member; and each of said plurality of bearing assemblies is aligned for engagement with either said upper groove or said lower groove.

13. The open throat power tong as defined in claim 4, wherein the radius of curvature of said arc-shaped groove is slightly larger than the radius of said ball member.

14. The open throat power tong as defined in claim 2, further comprising:

said partial ring member having a plurality of neutral cam surfaces adjacent said plurality of cam surfaces; and said arc-shaped groove is formed adjacent said neutral cam surfaces.

15. An open throat power tong assembly for rotating a tubular member to make up or break apart a threaded joint, comprising:

a tong body having a first throat portion for receiving said tubular member;

a cage plate assembly rotatably mounted to said tong body and having a second throat portion for receiving said tubular member;

a plurality of gripping members carried by said cage plate assembly and movable for gripping engagement with said tubular member;

a partial ring member rotatably mounted within said tong body and having a third throat portion for receiving said tubular member and a plurality of cam surfaces for increasing the force exerted by said gripping members on said tubular member;

said partial ring member having an arc-shaped groove formed on the surface of said partial ring member and having a variable diameter responsive to radial spreading of said partial ring member;

a plurality of bearing assemblies each mounted to said cage plate assembly; and each of said bearing assemblies including (a) support means axially movable with respect to said cage plate assembly for at least partially reducing frictional engagement between said cage plate assembly and said tong body;

(b) biasing means for restricting movement of said support means away from said arc-shaped groove during radial spreading of said partial ring member.

16. The power tong as defined in claim 15, wherein each of said bearing assemblies further comprises:

a cylindrical-shaped housing for substantially containing said support means; and stop means for retaining said support means within said housing.

17. The power tong as defined in claim 15, wherein said support means comprises a ball member, and said biasing means comprises a helical spring within said housing.

18. The power tong as defined in claim 17, wherein each of said bearing assemblies further comprises:

adjusting means for varying the forces exerted on said ball member by said helical spring.

19. The power tong as defined in claim 15 wherein, wherien said ball member further rotatably guides said cage plate assembly with respect to said partial ring.

20. The power tong as defined in claim 18, further comprising:

a cylindrical-shaped housing for substantially containing said support means;

a nut member for threaded engagement with said housing; and said adjusting means including a bolt member in threaded engagement with said nut member for compressing said helical spring.

* * * * *